United States Patent [19]

Kuch

[11] Patent Number: 4,496,531
[45] Date of Patent: Jan. 29, 1985

[54] PROCESS FOR THE PRODUCTION OF HYDROGEN AND CARBONYL SULFIDE FROM HYDROGEN SULFIDE AND CARBON MONOXIDE USING A PRECIOUS METAL PROMOTED METAL OXIDE/SULFIDE CATALYST

[75] Inventor: Philip L. Kuch, Aurora, Ohio

[73] Assignee: The Standard Oil Company, Cleveland, Ohio

[21] Appl. No.: 448,883

[22] Filed: Dec. 10, 1982

[51] Int. Cl.$^3$ .......................... C01B 31/06; C01B 3/04
[52] U.S. Cl. ................................. 423/416; 423/648 R
[58] Field of Search ................ 423/415 R, 416, 648 R

[56] References Cited
U.S. PATENT DOCUMENTS 3,856,925  12/1974  Kodera et al. ...................... 423/416

OTHER PUBLICATIONS

Fukuda et al., "Catalytic Activity of Metal Sulfides for the Reaction, $H_2S + CO = H_2 + COS$", Journal of Catalysis, vol. 49, pp. 379–382, 1977.

Primary Examiner—Earl C. Thomas
Attorney, Agent, or Firm—Teresan W. Gilbert; Joseph G. Curatolo; Larry W. Evans

[57] ABSTRACT

Hydrogen and carbonyl sulfide are produced by a process comprising contacting gaseous hydrogen sulfide with gaseous carbon monoxide in the presence of a precious metal promoted multi-metal oxide/sulfide catalytic composition, e.g. a catalyst of the formula:

$$Ag_{0.1}Ni_{0.45}Cu_{0.45}MoO_xS_y.$$

21 Claims, No Drawings

PROCESS FOR THE PRODUCTION OF HYDROGEN AND CARBONYL SULFIDE FROM HYDROGEN SULFIDE AND CARBON MONOXIDE USING A PRECIOUS METAL PROMOTED METAL OXIDE/SULFIDE CATALYST

BACKGROUND OF THE INVENTION

1. Field of the Invention

This invention relates to the production of hydrogen. In one aspect, the invention relates to the production of hydrogen from the reaction of hydrogen sulfide and carbon monoxide while in another aspect, the invention relates to conducting this reaction in the presence of various precious metal promoted metal oxide/sulfide catalysts.

2. Description of the Prior Art

Hydrogen is a valuable resource as both a fuel source and chemical feedstock and as such, its production has received much attention from the chemical industry. Presently, the dominant industrial method of production is the reaction of steam with natural gas (steam reforming) although various other methods are known. Of these other methods, one that is of particular interest is the oxidation of hydrogen sulfide with carbon monoxide to produce hydrogen and carbonyl sulfide.

This reaction is of particular interest for several reasons, one of which is that hydrogen sulfide is a relatively inexpensive material and is available in large quantities from the desulfurization of fossil fuels and sour natural gas deposits. Presently this material is considered more of a waste problem than a feedstock and is typically oxidized by the Claus process to water and elemental sulfur.

Another reason for the interest in this reaction is that it can be combined with other reactions to form various thermochemical cycles, such as

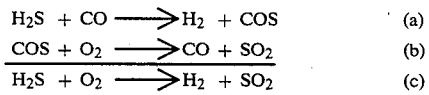

The second step which enables the recycle of relatively expensive carbon monoxide makes this thermochemical cycle economically attractive. In effect, hydrogen sulfide is combusted to hydrogen and sulfur dioxide, the latter being a useful resource in the manufacture of sulfuric acid.

While the reaction of hydrogen sulfide and carbon monoxide to produce hydrogen and carbonyl sulfide is known, few catalysts have been identified as useful for promoting it. Fukuda et al. describe in several publications the use of various metal sulfides, e.g. titanium disulfide, zinc sulfide, copper sulfide, nickel sulfide, etc. See U.S. Pat. No. 3,856,925; *Journal of Catalysis,* 49, 379 (1977); and *Bulletin of Chemistry for Japan,* 51, 150 (1978). However, since these disclosures describe relatively few catalysts, there is a continuing interest in identifying new catalysts for this reaction.

SUMMARY OF THE INVENTION

According to this invention, hydrogen and carbonyl sulfide are produced by a process comprising contacting gaseous hydrogen sulfide with gaseous carbon monoxide in the presence of a catalytic amount of a composition of the formula:

$$M_{0.1-2}M'_{0.01-1}M''_{0.01-1}O_xS_y \qquad (I)$$

where

M is at least one of Mo, W and Fe;

M' is at least one of Ru, Rh, Ag, Pt, Pd, Au, Re, Os and Ir;

M" is at least one of V, Cr, Ti, Co, Ni and Cu; and the sum of x+y is a number that satisfies the valence requirements of the other elements present.

Use of these catalysts permit the reaction to be conducted at relatively low temperatures (less than 300° C.) without sacrifice of reactant conversion or product selectivity.

DETAILED DESCRIPTION OF THE INVENTION

Catalysts:

As is taught by formula I, the catalytic composition of this invention is at least a four element material, i.e. a material containing at least one element M, at least one precious metal M', at least one element M" and at least one of oxygen and sulfur, all in designated, proportional amounts. Preferably, the subscript value of M in formula I is about 0.5 to about 1, of M' about 0.01 to about 0.5, and of M" about 0.25 to about 1. Preferred catalysts are those where M is one of molybdenum and tungsten, M' is at least one of silver, ruthenium and platinum and M" is at least one of nickel and copper. The values of x and y will vary with formulation, sulfiding and reaction conditions.

As is also taught by formula I, certain of the components can be combinations of two or more elements, e.g. M" can be a combination of nickel and copper. In such instances, the subscript value represents the sum of the elements (e.g. for M", the sum of the subscript values for nickel and copper is a number of about 0.01–1).

The exact structure or element arrangement of these catalysts is not known but the components are known to be present in the form of their oxides and/or sulfides. Moreover, these compositions are known not to be a mere physical mixture of their components but rather unique compositions where the individual components are chemically and/or physically bonded to one another.

The catalytic composition of this invention can be used either in the 100 percent active form or in a diluted form and can be either supported or unsupported. Suitable support materials include silicia, titania, alumina, silica-alumina, zirconia, silicon carbide, boron, various phosphates, etc., with the high surface area (>about 50 m²/g) gamma-aluminas and silica-aluminas preferred. If a support is used, the catalytic composition is generally present in an amount of at least about 10 weight percent, based on the combined weight of the support and the catalytic composition, perferably in an amount of at least 30 weight percent.

The catalytic compositions of formula I can be prepared by any one of a number of different methods, the particular method employed being a matter of convenience. A typical method of preparation involves the mixing of the appropriate metal components in the proper proportions in an aqueous mixture, removing the liquid media with or without a reducing agent, and calcining the solid product. The metal components can be added in any order during the preparation procedure but certain orders may be preferred to others depending upon the composition of the final catalyst. The metal components can be added as a nitrate, carbonate, halide, acetate, etc., as long as the anion to the metal is removable by calcination. Combinations of different metal sources, e.g. a halide and a carbonate, can also be used. If a support is used, the material comprising the support can be incorporated into the catalyst along with the other ingredients or the catalyst composition may be coated and/or impregnated onto or into the support. If the catalyst composition is to be coated onto a support, preferably the metal components of the catalyst are added as their oxides. After the catalyst components have been combined to form an aqueous mixture, the mixture is then taken to dryness and the dry solid obtained is calcined, typically in the absence of air. Other methods of preparation are known in the art and include such techniques as the use of nonaqueous or mixtures of nonaqueous and aqueous solvent or slurry media; pH adjustment of the catalyst precursor solution or slurry; multiple impregnations, coatings, and/or calcination steps, etc.

After the catalyst has been calcined, typically at a temperature between about 350° and about 800° C., the catalyst composition is preferably sulfided. This can be accomplished at a temperature between about 100°–800° C., preferably between about 300° and about 500° C. and at a pressure between about 1 and about 50 atmospheres, preferably between about 1 and about 10 atmospheres. The sulfiding can last from less than one hour to more than 24 hours with a typical sulfiding time of between about 1 and about 4 hours. Hydrogen sulfide is a preferred sulfiding agent but others, such as the various mercaptans (e.g. methyl mercaptan, ethyl mercaptan, etc.), can be used. The sulfiding can be done either neat or diluted, e.g. with such diluents as nitrogen, argon, carbon monoxide, etc., and it can be done before, after or during an optional reduction step with hydrogen. If done with a reduction step, the hydrogen sulfide:hydrogen mole ratio can vary widely, typically between 50:1 and 1:50.

The catalyst compositions can also be sulfided in situ with the feed and/or product stream of the process. This stream can produce a catalyst having a mixed oxide/sulfide content, the exact amount of each difficult to determine and subject to change over the course of the reaction until equilibrium is reached.

Reaction:

As stated earlier, the reaction of carbon monoxide with hydrogen sulfide to form carbonyl sulfide and hydrogen is a known vapor phase reaction and is described in such references as U.S. Pat. No. 3,856,925 and Fukuda et al., *Journal of Catalysis,* 49, 379 (1977). The reaction is typically conducted within a temperature range of 50°–800° C., preferably 200°–400° C., and within a pressure range of 0–500 psig, preferably 0–250 psig. Stoichiometric amounts of reactants are required although preferably an excess of hydrogen sulfide or carbon monoxide is present as a means of shifting the equilibrium to the right. The reaction can be conducted in any vapor phase reactor including the various fixed- and fluid-bed configurations and the contact time of the reactants over the catalyst bed will vary with the other process parameters. Typically a contact time of about 1 to about 20 seconds, preferably 2 to about 10 seconds is employed in a fixed-bed reactor.

The products of this process are hydrogen, carbonyl sulfide and minor amounts of other compounds, primarily methane and carbon dioxide. Hydrogen and carbonyl sulfide are the desired products, the former to be ultimately recovered and the latter a useful intermediate in various thermochemical cycles in which this reaction is but one step.

The following examples are illustrative embodiments of this invention. Unless indicated to the contrary, all parts and percentages are by mole.

SPECIFIC EMBODIMENTS

Catalyst Preparation:

The catalyst of Example 4 in the Table was prepared by the following procedure. The other catalysts reported in this Table were prepared by a similar procedure.

A high surface area gamma-alumina extrudate (47 g, surface area of about 200 m$^2$/g, pellet form) was obtained from Strem Chemicals and treated at 600° C. under nitrogen for several hours. A solution of copper nitrate Cu(NO$_3$)$_2$.3H$_2$O (0.83 g) and nickel nitrate Ni(NO$_3$)$_2$.6H$_2$O (0.77 g) in distilled water (21 cc) was then poured over the pellets and stirred well until essentially all the liquid was absorbed. The pellets were then dried for approximately two hours at 125° C. Ammonium heptamolybdate (NH$_4$)$_6$Mo$_7$O$_{24}$.4H$_2$O (2.78 g) was dissolved in water (20 cc) and poured over the dried pellets and stirred well until essentially all the liquid was absorbed. The pellets were then dried overnight at 125° C. Finally, silver nitrate AgNO$_3$ (0.31 g) was dissolved in water (15 cc) and added to the extrudates and the pellets were again dried at 125° C. for about four hours. Approximately 20 cc of the resulting catalyst precursor (gamma-alumina pellets impregnated with the various metal components) was then placed in a quartz tube (0.5" internal diameter, catalyst bed about 4" long) and held in place with quartz wool plugs. The precursor was then treated for about 15 minutes at room temperature with nitrogen, subsequently for about one hour at 400° C. with nitrogen and finally for about one hour at 400° C. with hydrogen sulfide. The resulting catalysts can be represented by the empirical formula:

$$Ag_{0.1}Ni_{0.45}Cu_{0.45}MoO_xS_y$$

Procedure and Conditions:

Unless otherwise noted, the reactions were conducted in the quartz tube used to condition and sulfide the catalyst precursor as described in the preceding paragraph. Following this pretreatment, a feed of hydrogen sulfide:carbon monoxide was introduced into the tube at a 1:1 molar ratio and at a flow rate that established a 10 second contact time of reactants over the catalyst bed. The off-gas rate was measured with a soap-film meter and the off-gas composition was determined after one hour of on-stream activity with the aid of a Carle 111 gas chromatograph equipped with a 158-b column system. Reject gases were scrubbed in a monoethanolamine/water solution and then vented to the hood. The reaction temperature of each example was approximately 400° C. and the tube was heated by means of a Lindberg tube furnace. The reactant gases were introduced into the tube from tanks through stainless steel tubing, regulators, flow controllers, and rotometers. The gases were purchased from the Matheson Gas Company and used without further purification.

The percent conversion as reported in the Table was calculated by subtracting the amount of hydrogen sulfide leaving the reactor from the amount of hydrogen sulfide fed to the reactor and dividing the difference by the amount of hydrogen sulfide fed to the reactor and then multiplying the quotient by 100. The ratios of hydrogen to methane and hydrogen to carbon dioxide were calculated by simply dividing the hydrogen recovered (in mole percent) by either the methane or carbon dioxide recovered (also in mole percent) and reporting the quotient. The higher the quotient, the better the selectivity. Although not reported in the Table, for each mole of hydrogen produced, one mole of carbonyl sulfide was also produced.

TABLE

REACTION OF HYDROGEN SULFIDE AND CARBON MONOXIDE IN THE PRESENCE OF VARIOUS PRECIOUS METAL PROMOTED MULTI-METAL OXIDE/SULFIDE CATALYSTS

| Example | Catalyst | $H_2S$ Conversion (%) | $H_2/CH_4$ | $H_2/CO_2$ |
|---|---|---|---|---|
| A | $Cu_{.5}Ni_{.5}MoO_xS_y$ | 11.3 | 0.66 | 0.46 |
| 1 | $Ir_{.1}Cu_{.45}Ni_{.45}MoO_xS_y$ | 16.21 | 0.69 | 0.46 |
| 2 | $Au_{.1}Cu_{.45}Ni_{.45}MoO_xS_y$ | 20.47 | 0.66 | 0.42 |
| 3 | $Ag_{.1}Cu_{.45}Ni_{.45}MoO_xS_y$ | 20.69 | 0.86 | 0.55 |
| 4 | $Pt_{.1}Cu_{.45}Ni_{.45}MoO_xS_y$ | 21.22 | 0.85 | 0.58 |
| 5 | $Pd_{.1}Cu_{.45}Ni_{.45}MoO_xS_y$ | 21.29 | 0.72 | 0.43 |
| 6 | $Rh_{.1}Cu_{.45}Ni_{.45}MoO_xS_y$ | 22.58 | 0.63 | 0.43 |
| 7 | $Ru_{.1}Cu_{.45}Ni_{.45}MoO_xS_y$ | 24.13 | 0.74 | 0.49 |
| 8 | $Ag_{.1}Cu_{.45}Ni_{.45}MoO_xS_y$ | 22.4 | 1.23 | 0.73 |
| 9 | $Ru_{.1}Cu_{.45}Ni_{.45}MoO_xS_y$* | 18.8 | 1.05 | 0.73 |
| 10 | $Ag_{.1}Cu_{.45}Ni_{.45}MoO_xS_y{}^1$ | 20.5 | 1.93 | 1.18 |
| 11 | $Ag_{.1}Cu_{.45}Ni_{.45}MoO_xS_y{}^2$ | 20.0 | ∞ | 5.8 |
| 12 | $Ag_{.1}Cu_{.45}Ni_{.45}MoO_xS_y{}^3$ | 9.8 | 4.94 | 2.06 |
| 13 | $Ag_{.1}Cu_{.45}Ni_{.45}WO_xS_y$ | 24.1 | 2.3 | 1.24 |
| 14 | $Ag_{.1}Cu_{.45}Ni_{.45}WO_xS_y{}^4$ | 22.0 | 7.59 | 2.41 |
| B | Silica-Alumina | 3.7 | ∞ | 5.4 |
| C | γ-Alumina# | 11.3 | 6.2 | 6.4 |
| D | Alundum-⅛" | 0 | — | — |

*Silica-alumina support.
[1]Silica-alumina support and reduced with hydrogen at 250° C. overnight prior to sulfiding.
[2]Reaction temperature 250° C.
[3]Silica-alumina support, hydrogen sulfide:carbon monoxide mole ratio of 4:1, and 7.5 seconds contact time.
[4]Contact time of 5 seconds.
Reaction temperature 600° C.

Control Examples B, C and D show the effectiveness of the catalytic compositions of this invention over simple support materials. A comparison of Examples A, 1–7 and 11 demonstrate the benefits of the precious metal promoter. Example A reports the performance of a catalyst system without such a promoter and Examples 1–7 show that the conversion improves to near the equilibrium limitation with modest selectivity improvement for similar conditions with a precious metal promoter. Example 11 shows the activity of the system is maintained at near the equilibrium conversions at much lower operating temperatures (250° C.). This is particularly beneficial in that many of these metals are known to be useful for the manufacture of methane from synthesis gas but methane manufacture generally requires relatively high temperatures. By lowering the temperature of the process, selectivity for the manufacture of hydrogen over methane and carbon dioxide is enhanced. In Example 11 hydrogen and carbonyl sulfide accounted for 91 percent of the converted reactants.

Although the preceding examples describe this invention in considerable detail, this detail is for the purpose of illustration only and is not to be construed as a limitation upon the invention as described in the specification or following claims.

What is claimed is:

1. A process for the production of hydrogen and carbonyl sulfide, the process comprising contacting gaseous hydrogen sulfide with gaseous carbon monoxide in the presence of a catalytic amount of a composition of the formula:

$$M_{0.1-2}M'_{0.01-1}M''_{0.01-1}O_xS_y \qquad (I)$$

where
M is at least one of Mo, W and Fe;
M' is at least one of Ru, Rh, Ag, Pt, Pd, Au, Re, Os and Ir;
M" is at least one of V, Cr, Ti, Co, Ni and Cu; and the sum of x+y is a number that satisfies the valence requirements of the other elements present.

2. The process of claim 1 where M is one of molybdenum and tungsten.

3. The process of claim 1 where M' is at least one of silver, ruthenium and platinum.

4. The process of claim 2 where M' is at least one of silver, ruthenium and platinum.

5. The process of claim 1 where M" is at least one of nickel and copper.

6. The process of claim 2 where M" is at least one of nickel and copper.

7. The process of claim 3 where M" is at least one of nickel and copper.

8. The process of claim 4 where M" is at least one of nickel and copper.

9. The process of claim 1 where the composition of formula I is used in combination with a support.

10. The process of claim 4 where the composition of formula I is used in combination with a support.

11. The process of claim 8 where the composition of formula I is used in combination with a support.

12. The process of claim 9 where the composition of formula I is present in an amount of at least about 10 weight percent, based on the combined weight of the support and the composition.

13. The process of claim 10 where the composition of formula I is present in an amount of at least about 10 weight percent, based on the combined weight of the support and the composition.

14. The process of claim 11 where the composition of formula I is present in an amount of at least about 10 weight percent, based on the combined weight of the support and the composition.

15. The process of claim 1 where the subscript value of M is about 0.5 to about 1, of M' about 0.01 to about 0.5 and of M" about 0.25 to about 1.

16. The process of claim 4 where the subscript value of M is about 0.5 to about 1, of M' about 0.01 to about 0.5 and of M" about 0.25 to about 1.

17. The process of claim 8 where the subscript value of M is about 0.5 to about 1, of M' about 0.01 to about 0.5 and of M" about 0.25 to about 1.

18. The process of claim 11 where the subscript value of M is about 0.5 to about 1, of M' about 0.01 to about 0.5 and of M" about 0.25 to about 1.

19. The process of claim 14 where the subscript value of M is about 0.5 to about 1, of M' about 0.01 to about 0.5 and of M" about 0.25 to about 1.

20. The process of claim 19 where the support is a high, surface area gamma-alumina.

21. The process of claim 1 wherein M' is at least one of Ru, Ag, Au, Re, Os and Ir.

* * * * *